July 21, 1953  L. R. PARTRIDGE  2,646,278
PASS-LINE STABILIZER FOR STRIP APPROACHING A SHEAR
Filed Jan. 19, 1951  2 Sheets-Sheet 1

Inventor:
LAWRENCE R. PARTRIDGE,
by: Donald G. Dalton
his Attorney.

July 21, 1953  L. R. PARTRIDGE  2,646,278
PASS-LINE STABILIZER FOR STRIP APPROACHING A SHEAR
Filed Jan. 19, 1951  2 Sheets-Sheet 2
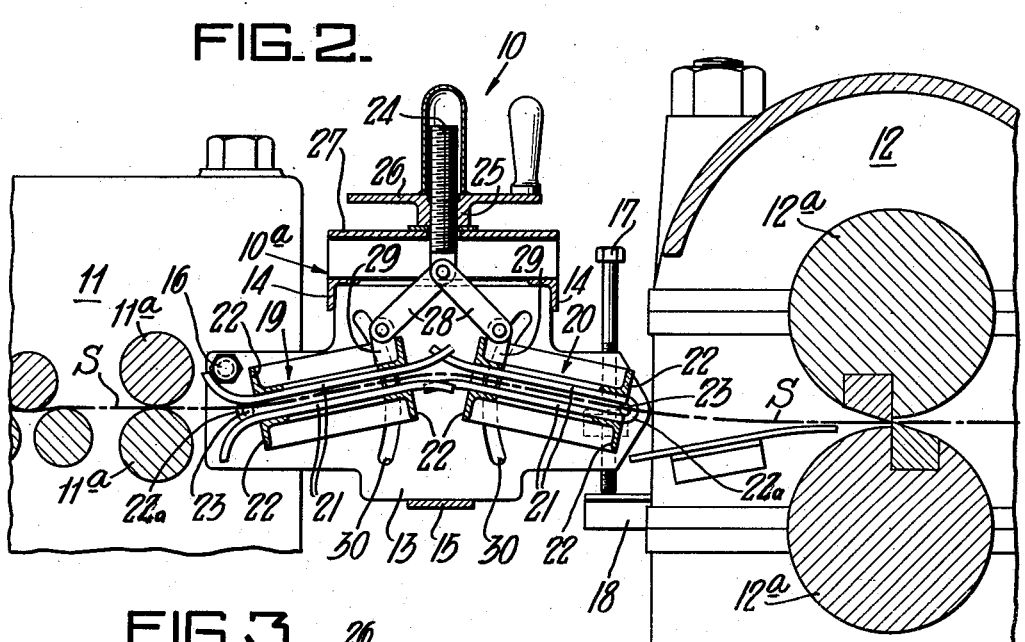
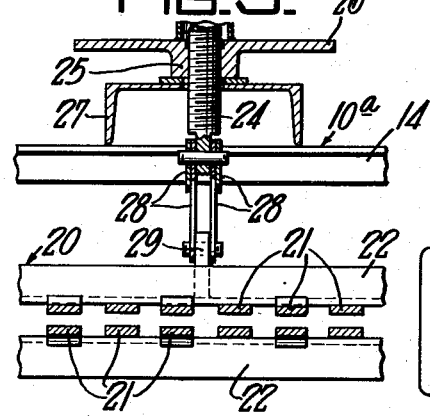
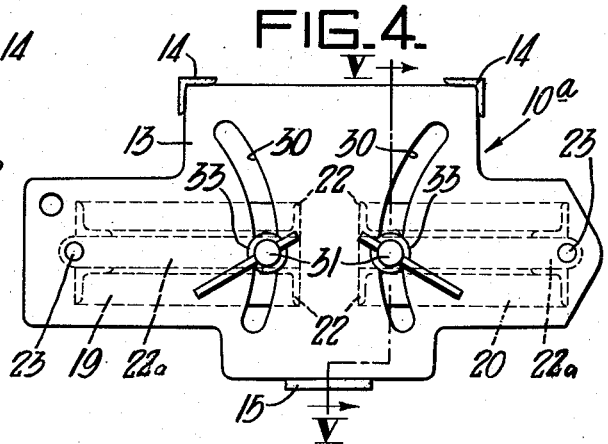
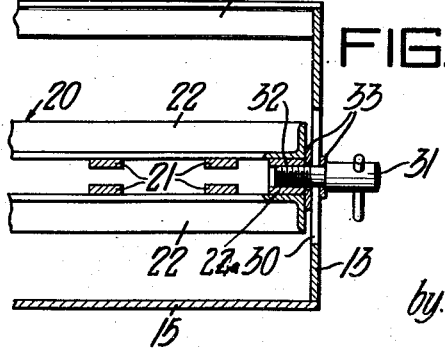
Inventor:
LAWRENCE R. PARTRIDGE,
by: Donald G. Dalton
his Attorney.

Patented July 21, 1953

2,646,278

UNITED STATES PATENT OFFICE 2,646,278

PASS-LINE STABILIZER FOR STRIP APPROACHING A SHEAR

Lawrence R. Partridge, Walnut Creek, Calif., assignor to United States Steel Corporation, a corporation of New Jersey Application January 19, 1951, Serial No. 206,805

11 Claims. (Cl. 271—2.3)

This invention relates to apparatus for stabilizing the position in space of that portion of a length of metal strip being fed to a shear, which is immediately ahead of the shear.

Sheet metal such as low-carbon steel is generally processed in the form of strip which, when finished, is cut into sheets of various lengths for use. Tin-plate in coils of strip, for example, is passed through a shearing line which may include an uncoiler, a side trimmer, a roller leveler and a rotary or flying shear, the shear being adjustable to cut sheets of different lengths from the strip as desired. In any event, a stand of pinch rolls or their equivalent is employed to feed the strip to the shear. A definite minimum spacing must be maintained between the pinch rolls and the shear to permit the strip to flex out of its normal pass line. This flexure or the small amount of slack afforded thereby insures proper shear operation by absorbing the shocks incident to successive cutting operations of the shear.

For each set of operating conditions, i. e., strip speed, gage and temper, the portion of the strip between the pinch rolls and shear loops upwardly to a predetermined height above the pass line. When the strip is running smoothly, the only variation in the loop is in the form of small waves resulting from the shock incident to successive cuts made by the shear. When the shear is adjusted so as to cut lengths near the maximum or minimum lengths for which it is designed, the strip does not run smoothly and the loop varies in size to a considerable extent. Even when the shear is cutting lengths near the middle of its range, however, the strip under certain conditions does not have sufficient rigidity to maintain a stable loop between the pinch rolls and shear and inaccurate cutting results.

I have invented a novel apparatus for stabilizing the path of the strip in a shearing line or maintaining a steady condition of the loop in the strip ahead of the shear and thus improving the accuracy of cutting under all conditions. In a preferred embodiment, I provide a pair of guide frames side-by-side, meshing at their adjacent edges and pivoted at the edges remote from each other so that, by similarly tilting both frames, they define a pass line deflected from the horizontal or straight-line path between the pinch rolls and shear. I also provide means for effecting angular adjustment of both frames to the same extent and means for locking them in adjusted positions. The entire apparatus, furthermore, is pivoted for tilting movement about the end adjacent the pinch rolls.

A complete understanding of the invention may be obtained from the following detailed description and explanation which refer to the accompanying drawings illustrating the present preferred embodiment. In the drawings, Figure 1 is a plan view showing my improved stabilizer in cooperative relation to a shear and pinch rolls adapted to feed strip thereto from a roller leveler;

Figure 2 is a transverse section taken along the plane of line II—II of Figure 1;

Figure 3 is a partial section taken along the plane of line III—III of Figure 1;

Figure 4 is an end elevation of the stabilizer alone; and

Figure 5 is a partial section taken along the plane of line V—V of Figure 4.

Figure 1:
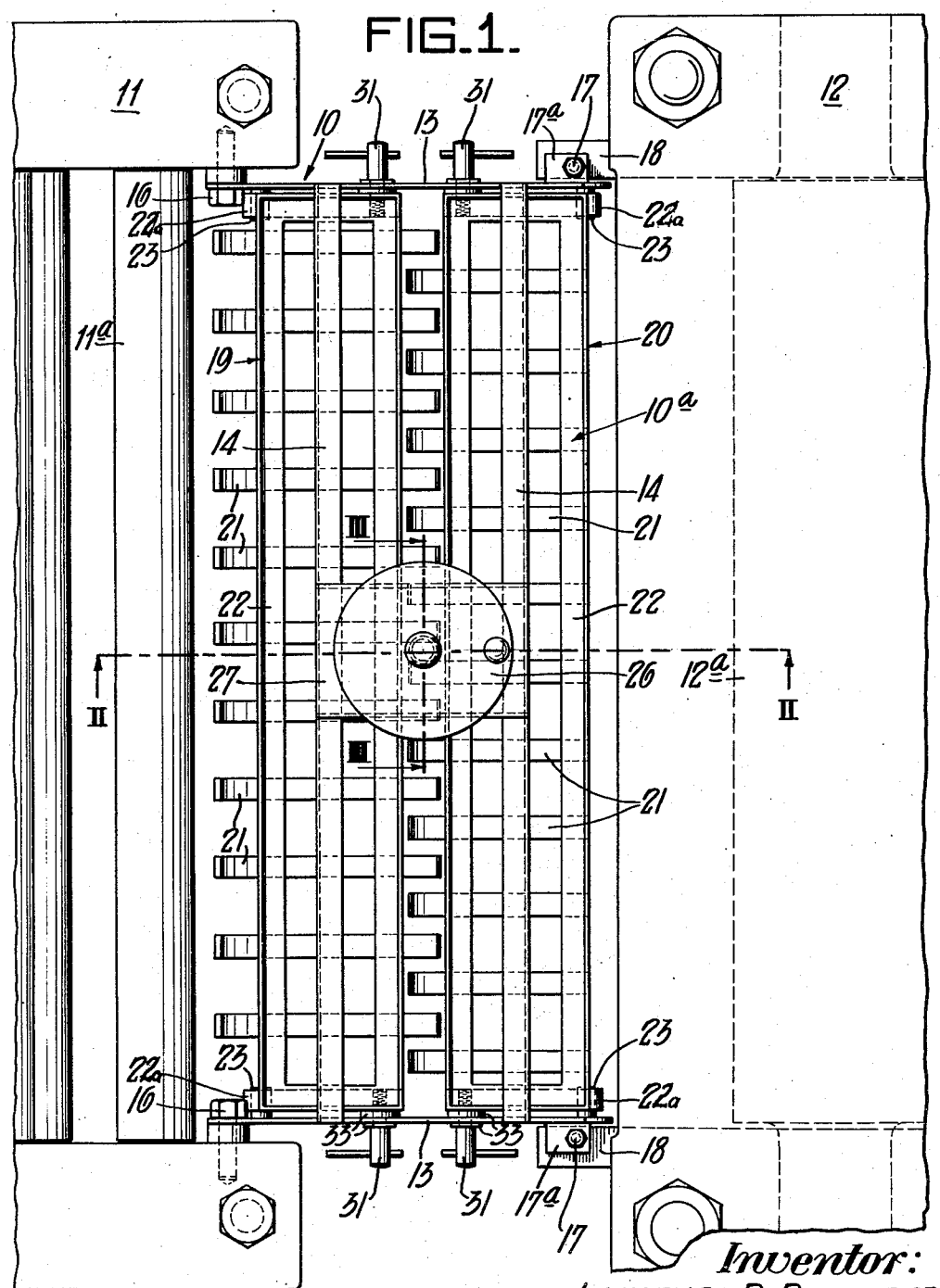

Referring now in detail to the drawings, the stabilizer of my invention is indicated generally at 10, and is preferably located between a roller leveler 11 including pinch rolls 11a and a flying shear 12 having cylindrical shearing rotors 12a. The stabilizer includes a supporting and enclosing frame 10a composed of side plates 13 connected by upper and lower bridging bars 14 and 15. The frame is pivotally mounted on the roller leveler by screws 16 extending through the side plates 13 at the end thereof adjacent the leveler. Screws 17 threaded through tapped holes in lugs 17a extending laterally from the side plates at the end thereof adjacent the shear bear on brackets 18 extending rearwardly from the latter. By turning these screws, the frame may be tilted about the axis of screws 16.

Guide frames 19 and 20 disposed side-by-side extend between side plates 13. Each guide frame is composed of a plurality of pairs of spaced bars 21, the pairs of bars being spaced apart along the guide frames. The bars 21 are welded to spaced longitudinal angle bars 22. The bars 22 are connected together at their ends by hinge bars 22a to constitute a rigid assembly with a clear space between the bars 21 of all the pairs, extending across the width of the stabilizer for the unobstructed passage of the strip. Each frame thus comprises upper and lower grids formed by bars 21 and 22.

As shown in Figure 1, the bars 21 of the two guide frames 19 and 20 are staggered and the adjacent ends of the bars of the two frames "mesh" or fit between each other. The adjacent ends are also slightly flared to facilitate threading the end of a strip through the length of the guide frame. The guide frames are pivoted at their outer edges to the side plates 13 by pins 23 extending through hinge bars 22a. It is thus possible to tilt the guide frames so that the clear space between the bars 21 thereof forms a guide path for the strip, deflected from the horizontal pass line between the pinch rolls 11a of the roller leveler and the rotors 12a of shear 12.

In order to permit simultaneous tilting adjustment of both the guide frames to the same extent, I provide screw-down mechanism including a screw 24 disposed vertically in frame 10a. The screw is threaded through a tapper bore in the hub 25 of a hand wheel 26. The hub rests on a length of channel bar 27 extending between the upper bridging bars 14. The screw 24 is pivotally connected to guide frames by links 28 and lugs 29 welded to the upper adjacent bars 22 of the guide frames.

In order to secure the guide frames in any angular position to which they may be adjusted by the screw-down mechanism, arcuate slots 30 are formed in the side plates 13 and clamp screws 31 are inserted through the slots and threaded into tapped holes in hinge bars 22a at the ends of the guide frames. Clamping washers or bearing discs 33 are disposed on the screws 31 on the inside and outside of the side plates 13 and the screws have a shoulder intermediate their ends whereby the washers are clamped to the side plate when the screws are tightened.

When the guide frames are adjusted to the positions shown in Figure 2, they serve to confine the strip S to a path deflected from the normal pass line as aforesaid. The adjustment of the guide frames will be altered to conform to the actual deflection of the portion of the strip between the leveler and shear operations. That is to say, with the strip traveling through the shear, the hand wheel 26 is operated to raise or lower the guide frames until the path defined thereby coincides with the natural position of the loop with the strip. The guide frames are then secured by the clamping screws 31. When thus adjusted, the guide frames stabilize the strip loop but, at the same time, the space between the pairs of bars 21 affords a slight amount of slack sufficient to permit absorption of the shocks incident to successive cutting operations of the shear. With the actual pass line stabilized by the guide frames, it is possible to operate the shear satisfactorily when adjusted for making cuts near the maximum and minimum lengths of which it is capable. In addition, the stabilizer minimizes mis-cuts, sheets cut off-square and creased sheets, particularly when operating near the upper limit of permissible speed.

Although I have disclosed herein the preferred embodiment of my invention, I intend to cover as well any change or modification therein which may be made without departing from the spirit and scope of the invention.

I claim:

1. Apparatus for stabilizing the excess strip between a shear and a pair of feed rolls spaced therefrom comprising a pair of guide frames disposed side-by-side and lying generally in the plane of the pass line through the rolls and shear, each frame including spaced upper and lower guide members defining a clear space therebetween through which the strip travels, means pivotally mounting the edges of the frames adjacent the rolls and shear, respectively, and common means for tilting both frames out of the pass line to substantially the same degree, whereby the frames are effective to confine the strip passing therethrough to a predetermined path bowing away from said pass line.

2. The apparatus defined by claim 1 characterized by a supporting and enclosing frame in which the guide frames are pivotally mounted.

3. The apparatus defined by claim 2 characterized by said tilting means including a screw disposed vertically in said supporting and enclosing frame, and means connecting the guide frames to the screw.

4. The apparatus defined by claim 2 characterized by pivotal mounting means for one side of said supporting and enclosing frame and means for adjusting the elevation of the other side thereof.

5. The apparatus defined by claim 4 characterized by said elevation-adjusting means including a pair of screws.

6. Apparatus for stabilizing the excess strip between a shear and a pair of feed rolls spaced therefrom comprising a pair of spaced side plates extending between the rolls and shear, a pair of guide frames side-by-side extending between said side plates, each frame including upper and lower grids spaced apart to receive the strip therebetween, means pivotally mounting the edges of the guide frames adjacent said rolls and shear on said side plates and a screw down carried by said side plates for adjusting the adjacent edges of the guide frames vertically.

7. The apparatus defined by claim 6 characterized by bridging bars extending between the side plates and mounting said screw down.

8. The apparatus defined by claim 6 characterized by means pivotally mounting the side plates on one side thereof and means for vertically adjusting the other side thereof.

9. The apparatus defined by claim 1 characterized by each of said guide members being composed of a grid of spaced bars, the bars extending along said path.

10. The apparatus defined by claim 9 characterized by the bars of the two guide frames being staggered and interfitting with each other at the adjacent sides of the frames.

11. Apparatus for controlling the strip between a shear and a pair of feed rolls spaced therefrom comprising a pair of guide frames disposed side-by-side and lying generally in the plane of the pass line through the rolls and shear, means pivotally mounting the edges of the frames adjacent the rolls and shear, respectively, common means for tilting both frames out of the pass line to substantially the same degree, a supporting frame enclosing the guide frames including spaced side plates and means for clamping the guide frames to one of the side plates in adjusted positions.

LAWRENCE R. PARTRIDGE.

References Cited in the file of this patent

UNITED STATES PATENTS

| Number | Name | Date |
| --- | --- | --- |
| 1,072,676 | Waterman | Sept. 9, 1913 |
| 1,859,336 | MacChesney et al. | May 24, 1932 |
| 2,076,969 | Sieger | Apr. 13, 1937 |
| 2,141,104 | Buccicone | Dec. 20, 1938 |
| 2,337,047 | Hunter | Dec. 21, 1943 |